United States Patent
Wright et al.

(10) Patent No.: US 11,972,393 B2
(45) Date of Patent: Apr. 30, 2024

(54) SYSTEM AND METHOD FOR PRODUCT CLASSIFICATION

(71) Applicant: Shopify Inc., Ottawa (CA)

(72) Inventors: Asher Wright, Toronto (CA); Romain Guigourès, Calgary (CA)

(73) Assignee: Shopify Inc., Ottawa (CA)

( * ) Notice: Subject to any disclaimer, the term of this patent is extended or adjusted under 35 U.S.C. 154(b) by 315 days.

(21) Appl. No.: 17/333,135

(22) Filed: May 28, 2021

(65) Prior Publication Data

US 2022/0383242 A1 Dec. 1, 2022

(51) Int. Cl.
  *G06Q 10/087*  (2023.01)
  *G06Q 10/0832* (2023.01)
  *G06Q 10/0835* (2023.01)

(52) U.S. Cl.
  CPC ....... *G06Q 10/087* (2013.01); *G06Q 10/0832* (2013.01); *G06Q 10/0835* (2013.01)

(58) Field of Classification Search
  CPC ............. G06Q 10/087; G06Q 10/0832; G06Q 10/0835
  See application file for complete search history.

(56) References Cited

U.S. PATENT DOCUMENTS

| | | | | |
|---|---|---|---|---|
| 6,397,115 B1* | 5/2002 | Basden | .................. | G06Q 10/08 700/83 |
| 8,538,826 B1* | 9/2013 | Lai | ..................... | G06Q 30/0635 705/26.1 |
| 8,572,013 B1* | 10/2013 | Nash | ....................... | G06F 16/35 706/20 |
| 10,325,239 B2* | 6/2019 | Gittleman | .......... | G06Q 10/0832 |
| 10,417,602 B2* | 9/2019 | Farley | .................. | G06Q 10/083 |
| 10,664,787 B2* | 5/2020 | Parris | .................. | G06Q 10/083 |
| 10,719,802 B2* | 7/2020 | Bennett | ............... | G06Q 30/018 |
| 11,037,088 B1* | 6/2021 | Woo | ...................... | G06Q 10/087 |
| 11,107,029 B1* | 8/2021 | Henry | .................. | G06F 9/4881 |
| 2003/0093366 A1* | 5/2003 | Halper | .................. | G06Q 40/02 705/38 |
| 2004/0143516 A1* | 7/2004 | Hastie | .................... | G06Q 30/06 705/27.1 |
| 2008/0294536 A1* | 11/2008 | Taylor | .................. | G06Q 10/087 705/28 |
| 2011/0137685 A1* | 6/2011 | Tracy | ..................... | G06Q 40/08 705/4 |
| 2015/0052019 A1* | 2/2015 | Field-Darraugh | ... | G06Q 10/087 705/26.62 |

(Continued)

OTHER PUBLICATIONS

Zhen-tao, Q. U., and Wang Yu-hui. "Research on risk assessment of hazardous freight road transportation based on BP neural network." 2010 International Conference on Logistics Systems and Intelligent Management (ICLSIM). vol. 2. IEEE, 2010. (Year: 2010).*

(Continued)

*Primary Examiner* — Asfand M Sheikh
(74) *Attorney, Agent, or Firm* — Rowand LLP

(57) ABSTRACT

A computer-implemented method comprises receiving, from a computing device associated with a merchant, product information about a product; classifying, based on the product information, the product into a handling class associated with handling of the product; and storing an indication of classification in association with the product information about the product.

25 Claims, 8 Drawing Sheets

(56) References Cited

U.S. PATENT DOCUMENTS

| | | | | |
|---|---|---|---|---|
| 2015/0100514 | A1* | 4/2015 | Parris | G06Q 10/0837 |
| | | | | 705/340 |
| 2015/0170111 | A1* | 6/2015 | Evenson | G06Q 50/26 |
| | | | | 705/308 |
| 2016/0026931 | A1* | 1/2016 | Tambos | G06N 20/00 |
| | | | | 706/12 |
| 2017/0083864 | A1* | 3/2017 | Saito | G06Q 30/0635 |
| 2017/0270468 | A1* | 9/2017 | Natarajan | G06N 5/04 |
| 2019/0005510 | A1* | 1/2019 | Cohen | G06Q 30/0218 |
| 2019/0138974 | A1* | 5/2019 | Knight | G06Q 10/083 |
| 2020/0210947 | A1* | 7/2020 | Devarakonda | G06Q 10/087 |
| 2022/0253802 | A1* | 8/2022 | Streebin | G06Q 40/08 |
| 2022/0301031 | A1* | 9/2022 | Iyer | G06Q 30/0623 |
| 2022/0374797 | A1* | 11/2022 | Kalinski | G06Q 10/0635 |

OTHER PUBLICATIONS

"ImageNet Classification with Deep Convolutional Neural Networks", authored by Krizhevsky et al., Communications of the ACM (vol. 60, Issue 6, Jun. 2017), pp. 84-90 and available on the Internet: <https://papers.nips.cc/paper/2012/file/c399862d3b9d6b76c8436e924a68c45b-Paper.pdf>.

"Image Similarity Using Deep CNN and Curriculum Learning,", authored by Appalaraju et al., arXiv: 1709.08761, 2017 and available on the Internet: < https://arxiv.org/pdf/1709.08761.pdf>.

"Cost-Effective Active Learning for Deep Image Classification," authored by Wang et al., IEEE Transactions on Circuits and Systems for Video Technology (vol. 27, Issue 12, Dec. 2017), pp. 2591-2600 and available on the Internet <https://arxiv.org/pdf/1701.03551.pdf>.

\* cited by examiner

FIG. 2

SYSTEM AND METHOD FOR PRODUCT CLASSIFICATION

FIELD

The present disclosure relates to classification systems, and more particularly, to systems and methods for product classification.

BACKGROUND

Products are often shipped by merchants to places, such as fulfillment centers, where they are stored for fulfillment. The fulfillment centers often rely on the merchant to provide information relating to the products and this information may be used by the fulfillment centers to accept and process inbound shipments.

BRIEF DESCRIPTION OF THE DRAWINGS

Embodiments will be described, by way of example only, with reference to the accompanying figures wherein:

FIG. 2 is an example of a home page of an administrator according to an embodiment;

DETAILED DESCRIPTION

Figure 1:
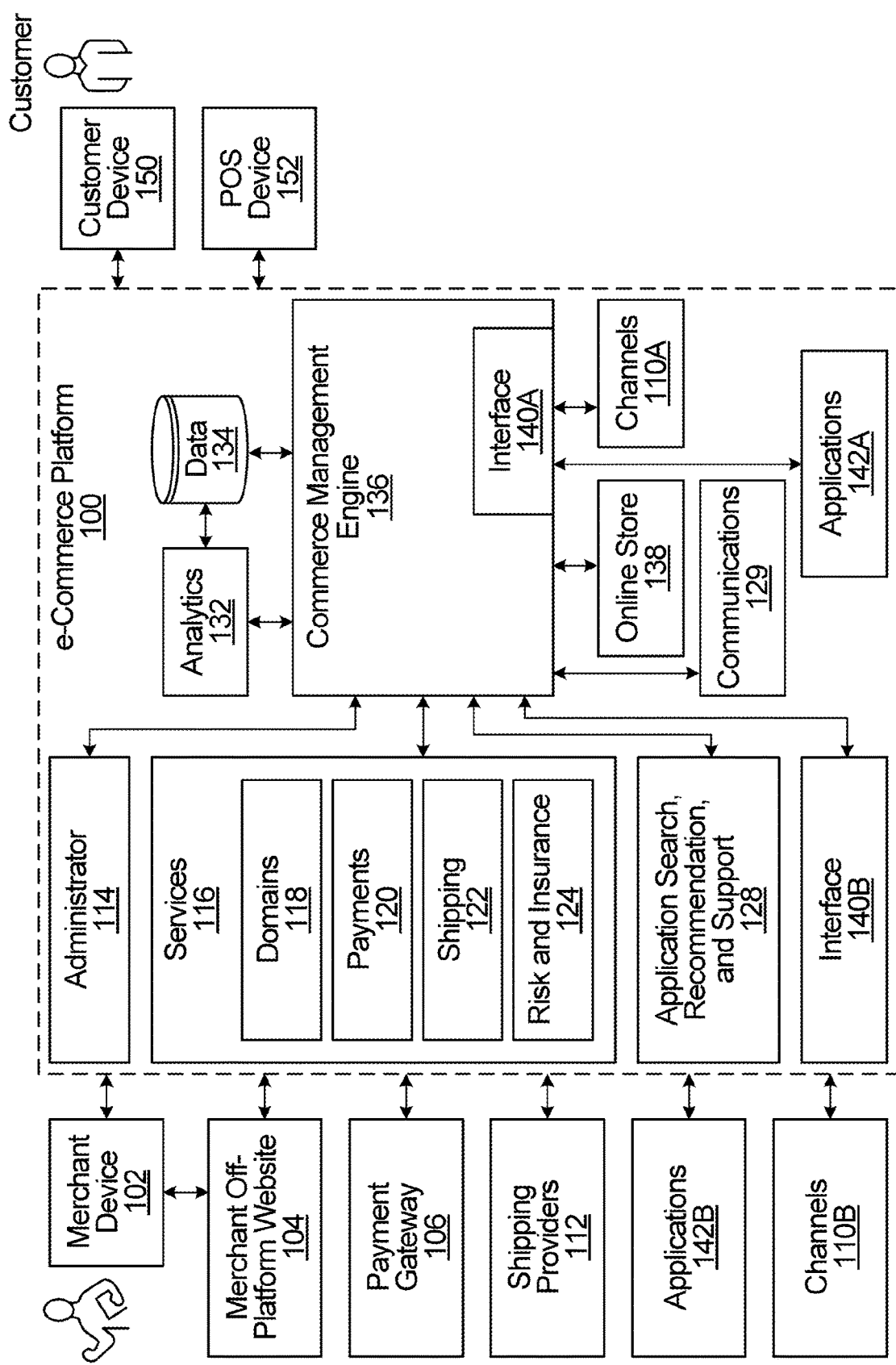
FIG. 1 is a block diagram of an example e-commerce platform according to an embodiment.

Some products may be undesirable to fulfillment centers. For example, some products such as aerosol containers, loaded firearms/ammunition and live animals may be unfit or dangerous to handle and thus may be undesirable. As another example, some products such as lithium batteries or products including sharp or fragile items may require additional handling and care and thus may be undesirable. As yet another example, some products may be banned from certain regional jurisdictions and thus may be undesirable.

The merchant may not be aware of the risk and/or cost associated with the handling of one or more products and as such products that are undesirable to the fulfillment center may be received unknowingly or unwillingly. The fulfillment center must therefore manually vet every inbound transfer and perform a first article inspection for each new product upon arrival. When a product is flagged by the fulfillment center as undesirable, the fulfillment center must destroy the product or return the product to the merchant.

It would be advantageous to classify a product into a handling class associated with handling of the product prior to the product being shipped.

In accordance with one aspect, the present application provides systems and methods for product classification. Specifically, the systems and methods may receive product information about a product and, based on the product information, classify the product into a handling class associated with handling of the product. An indication of the classification may be stored in association with the product information about the product. When a request to ship the product to a place where products are stored for fulfillment is received, the classification may be used to auto-approve a product that is classified into a particular handling class such that the product does not require additional inspection upon arrival. In this manner, the system may automatically approve products that are classified into particular handling classes allowing human intervention to be limited or otherwise avoided.

In one aspect there may be provided a computer-implemented method. The computer-implemented method may comprise receiving, from a computing device associated with a merchant, product information about a product; classifying, based on the product information, the product into a handling class associated with handling of the product; and storing an indication of the classification in association with the product information about the product.

In one or more embodiments, the computer-implemented method may further comprise determining that the product is classified into a particular handling class; and responsive to determining that the product is classified into the particular handling class, triggering generation of a shipping label.

In one or more embodiments, the computer-implemented method may further comprise receiving a signal corresponding to a request to ship the product to a place where products are stored for fulfillment.

In one or more embodiments, the computer-implemented method may further comprise determining that the product is classified into a first particular handling class; and responsive to determining that the product is classified into the first particular handling class, triggering a rejection of the request to ship the product to the place where products are stored for fulfillment.

In one or more embodiments, the computer-implemented method may further comprise determining that the product is classified into a second particular handling class; and responsive to determining that the product is classified into the second particular handling class, triggering an acceptance of the request to ship the product to the place where products are stored for fulfillment.

In one or more embodiments, the computer-implemented method may further comprise determining that the product is classified into a third particular handling class; and responsive to determining that the product is classified into the third particular handling class, triggering a request to accept an additional fee for shipping the product to the place where products are stored for fulfillment.

In one or more embodiments, classifying, based on the product information, the product into the handling class associated with handling the product may include generating, based on the product information, at least one risk score associated with handling of the product; and comparing the at least one risk score to a threshold to classify the product into the handling class associated with handling the product.

In one or more embodiments, the at least one risk score associated with handling of the product may be generated using a machine-learning based module trained to provide a likelihood that the product belongs to one or more risk categories.

In one or more embodiments, receiving product information about the product may comprise sending, to the computing device associated with the merchant, a signal corresponding to a request to identify one or more known risks associated with handling of the product; and receiving, from the computing device associated with the merchant, a signal identifying one or more known risks associated with handling of the product.

In one or more embodiments, the computer-implemented method may further comprise determining, based at least on the at least one risk score, that the machine-learning based module has identified a risk not identified by the merchant; sending, to the computing device associated with the merchant, a signal corresponding to a request to confirm that the product has the risk not identified by the merchant; and receiving, from the computing device associated with the merchant, a signal confirming that the product has the risk not identified by the merchant.

In one or more embodiments, the computer-implemented method may further comprise obtaining information relating to one or more other products previously shipped by the merchant; and adjusting the threshold based on the information relating to the one or more other products previously shipped by the merchant.

In one or more embodiments, the classification may be retrievable for use in automating handling of the product.

In one or more embodiments, the product information may include one or more product images.

In another aspect, there may be provided a system. The system may comprise one or more processors; a processor-readable storage medium containing processor-executable instructions that, when executed by the one or more processors, are to cause the one or more processors to receive, from a computing device associated with a merchant, product information about a product; classify, based on the product information, the product into a handling class associated with handling of the product; and store an indication of classification in association with the product information about the product.

In one or more embodiments, the processor-executable instructions, when executed by the one or more processors, may further cause the one or more processors to determine that the product is classified into a particular handling class; and responsive to determining that the product is classified into the particular handling class, trigger generation of a shipping label.

In one or more embodiments, the processor-executable instructions, when executed by the one or more processors, may further cause the one or more processors to receive a signal corresponding to a request to ship the product to a place where products are stored for fulfillment.

In one or more embodiments, the processor-executable instructions, when executed by the one or more processors, may further cause the one or more processors to determine that the product is classified into a first particular handling class; and responsive to determining that the product is classified into the first particular handling class, trigger a rejection of the request to ship the product to the place where products are stored for fulfillment.

In one or more embodiments, the processor-executable instructions, when executed by the one or more processors, may further cause the one or more processors to determine that the product is classified into a second particular handling class; and responsive to determining that the product is classified into the second particular handling class, trigger an acceptance of the request to ship the product to the place where products are stored for fulfillment.

In one or more embodiments, the processor-executable instructions, when executed by the one or more processors, may further cause the one or more processors to determine that the product is classified into a third particular handling class; and responsive to determining that the product is classified into the third particular handling class, trigger a request to accept an additional fee for shipping the product to the place where products are stored for fulfillment.

In one or more embodiments, when classifying, based on the product information, the product into the handling class associated with handling the product, the processor-executable instructions, when executed by the one or more processors, may further cause the one or more processors to generate, based on the product information, at least one risk score associated with handling of the product; and compare the at least one risk score to a threshold to classify the product into the handling class associated with handling the product.

In one or more embodiments, the at least one risk score associated with handling of the product may be generated using a machine-learning based module trained to provide a likelihood that the product belongs to one or more risk categories.

In one or more embodiments, when receiving product information about the product, the processor-executable instructions, when executed by the one or more processors, may further cause the processor to send, to the computing device associated with the merchant, a signal corresponding to a request to identify one or more known risks associated with handling of the product; and receive, from the computing device associated with the merchant, a signal identifying one or more known risks associated with handling of the product.

In one or more embodiments, the processor-executable instructions, when executed by the one or more processors, may further cause the processor to determine, based at least on the at least one risk score, that the machine-learning based module has identified a risk not identified by the merchant; send, to the computing device associated with the merchant, a signal corresponding to a request to confirm that the product has the risk not identified by the merchant; and receive, from the computing device associated with the merchant, a signal confirming that the product has the risk not identified by the merchant.

In one or more embodiments, the processor-executable instructions, when executed by the one or more processors, may further cause the processor to generate, based on the product information, at least one risk score associated with handling of the product; and compare the at least one risk score to a threshold to classify the product into the handling class associated with handling the product.

In another aspect there may be provided a non-transitory computer-readable storage medium storing processor-executable instructions that, when executed by one or more processors, may cause the one or more processors to receive, from a computing device associated with a merchant, product information about a product; classify, based on the product information, the product into a handling class associated with handling of the product; and store an indication of the classification in association with the product information about the product.

For illustrative purposes, specific example embodiments will now be explained in greater detail below in conjunction with the figures.

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

FIG. 1 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 1, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other Internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a transitory memory such as for example, random access memory (RAM), and/or a non-transitory memory such as, for example, a non-transitory computer readable medium such as, for example, persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network 420 connected to the e-commerce platform 100. For example, the online store 138 may serve or send content in response to requests for data 134 from the customer device 150, where a browser (or other application) connects to the online store 138 through a network 420 using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

FIG. 2 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 2. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 1, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementation in an e-Commerce Platform

Figure 3:
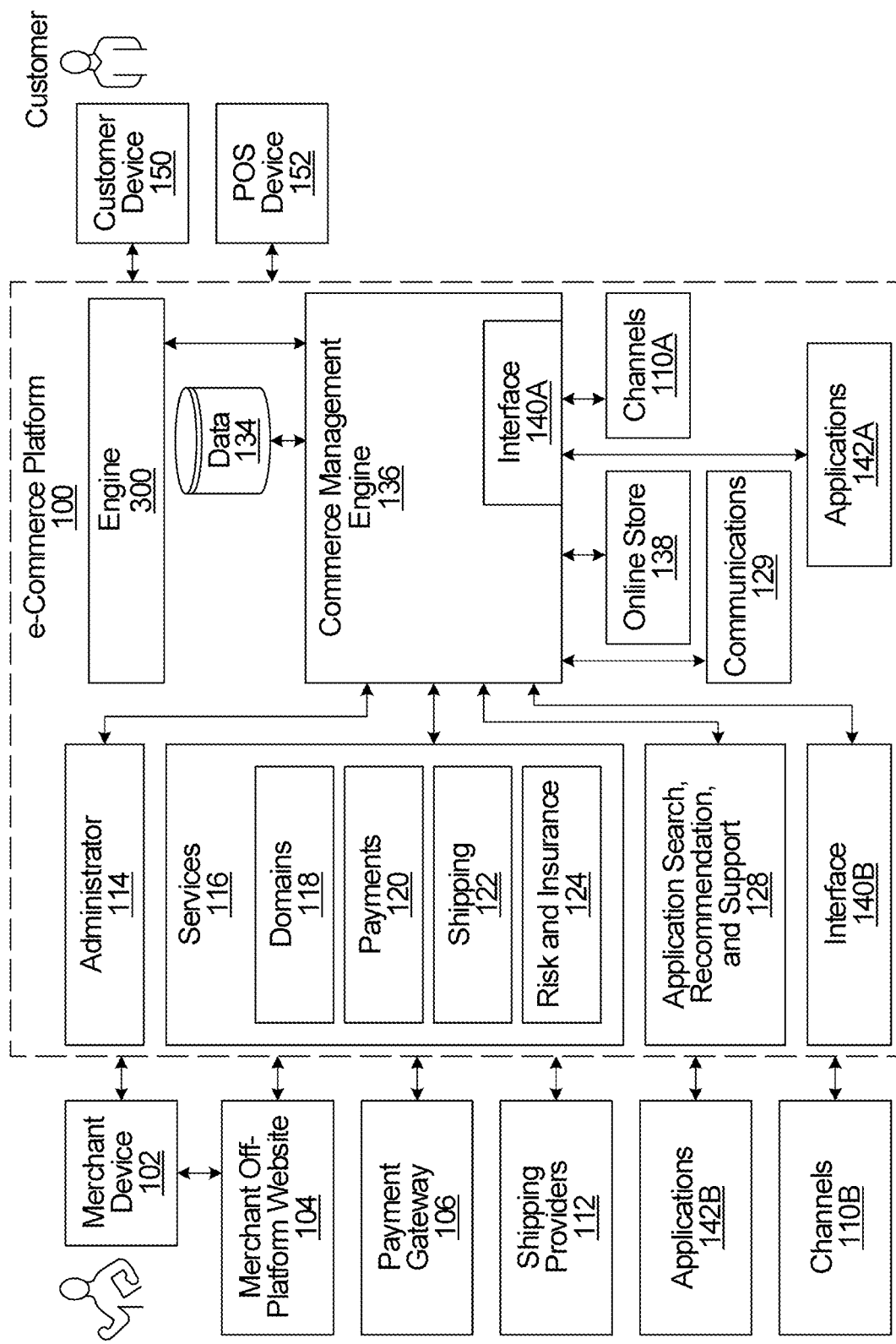
FIG. 3 is a block diagram of another example e-commerce platform according to an embodiment.

The functionality described herein may be used in commerce to provide improved customer or buyer experiences. The e-commerce platform 100 could implement the functionality for any of a variety of different applications, examples of which are described elsewhere herein. FIG. 3 illustrates the e-commerce platform 100 of FIG. 1 but including an engine 300. The engine 300 is an example of a computer-implemented system that implements the functionality described herein for use by the e-commerce platform 100, the customer device 150 and/or the merchant device 102.

Although the engine 300 is illustrated as a distinct component of the e-commerce platform 100 in FIG. 3, this is only an example. An engine could also or instead be provided by another component residing within or external to the e-commerce platform 100. In some embodiments, either or both of the applications 142A-B provide an engine that implements the functionality described herein to make it available to customers and/or to merchants. Furthermore, in some embodiments, the commerce management engine 136 provides that engine. However, the location of the engine 300 is implementation specific. In some implementations, the engine 300 is provided at least in part by an e-commerce platform, either as a core function of the e-commerce platform or as an application or service supported by or communicating with the e-commerce platform. Alternatively, the engine 300 may be implemented as a stand-alone service to clients such as a customer device 150 or a merchant device 102. In addition, at least a portion of such an engine could be implemented in the merchant device 102 and/or in the customer device 150. For example, the customer device 150 could store and run an engine locally as a software application.

As discussed in further detail below, the engine 300 could implement at least some of the functionality described herein. Although the embodiments described below may be implemented in association with an e-commerce platform, such as (but not limited to) the e-commerce platform 100, the embodiments described below are not limited to e-commerce platforms.

The engine 300 may be a risk engine configured to generate at least one risk score associated with handling a product. For example, the merchant may not be aware of the risk and/or cost associated with the handling of a particular product. As such, the engine 300 may be configured to generate at least one risk score associated with handling the product based on product information provided by the user. The product information may include a name of the product, a category of the product, a description of the product, one or more product images, a stock-keeping unit (SKU) of the product, etc. It will be appreciated that handling of the product may be associated with shipping the product, handling the product and/or storing the product.

An indication of the risk score is stored in association with the product information about the product. In this manner, when a request to ship the product to a place where products are stored for fulfillment is received, the indication of the at least one risk score may be used to auto-approve the product when the product is deemed low risk.

The at least one risk score may be used to classify a product into a handling class associated with handling of the product. For example, the engine 300 may be a classification engine configured to classify a product into a handling class associated with handling of the product. In this example, the engine 300 may classify the product into a handling class based on the at least one risk score.

An indication of the classification is stored in association with the product information about the product. In this manner, when a request to ship the product to a place where products are stored for fulfillment is received, the indication of the classification may be used to auto-approve the product when the product is determined to be classified into a particular handling class.

Figure 4:
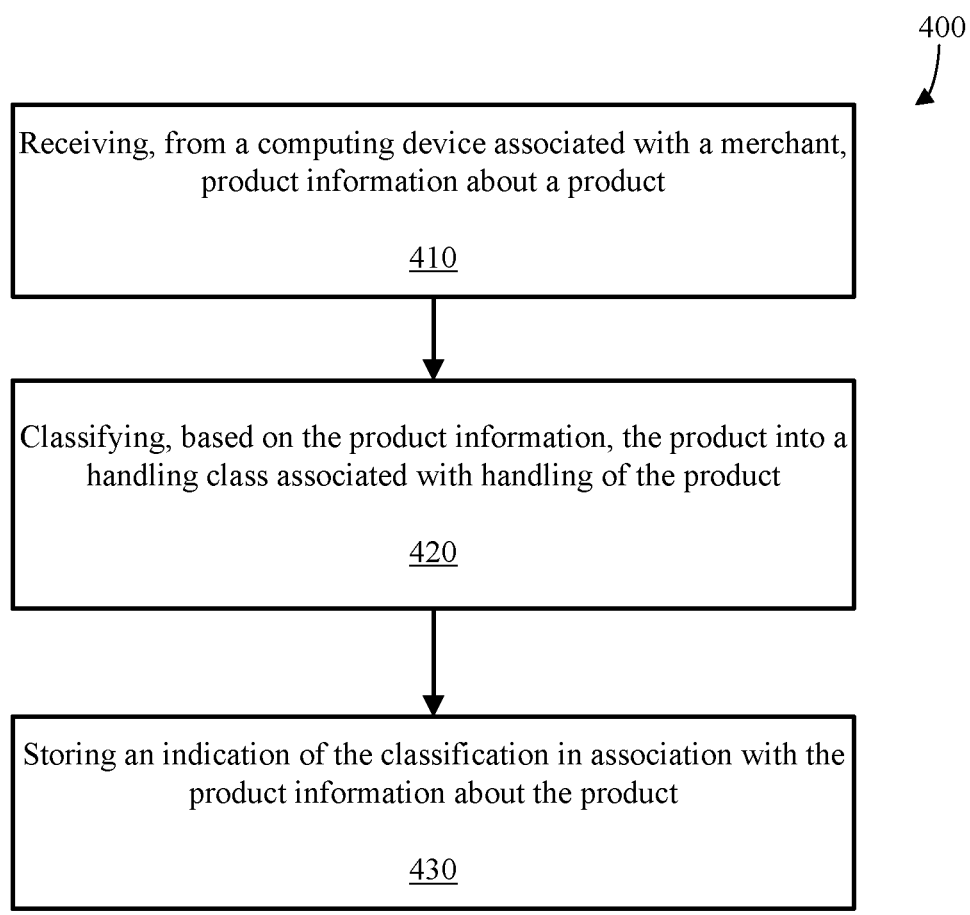
FIG. 4 is a flowchart illustrating an example method for product classification.

An example method 400 for product classification is described below with reference to FIG. 4. The method 400 may be implemented by a computing device having suitable computer-executable instructions for causing the computing device to carry out the described operations. The instructions may be implemented by way of an application executing on a computing device. The method 400 may be implemented, in whole or in part, by a server that may be part of the e-commerce platform 100 and/or the engine 300. The server may off-load some operations of the method 400 to a user device such as the merchant device 102 (FIGS. 1 and 3).

The method 400 includes receiving product information about a product (step 410).

The product is a product being added to the e-commerce platform. For example, the product may be a product being added to an online store on the e-commerce platform. As another example, the product may be a product being added to the e-commerce platform for wholesale purposes and/or to be given away as a free product. In this embodiment, the product information may include one or more of a name of the product, a category of the product, a description of the product, one or more product images, a stock-keeping unit (SKU) of the product, etc.

The product information may be received directly from the merchant. For example, the product information may be received from a computing device associated with a merchant such as for example the merchant device 102. In this example, when adding the product to the online store, the merchant may be required to provide a name and description of the product. The merchant may also be required to upload one or more product images of the product.

At least some product information may be obtained by the server. For example, when adding the product to the online store, the merchant may provide the SKU of the product. Using the SKU, one or more product images of the product may be obtained by the server.

The method 400 includes classifying, based on the product information, the product into a handling class associated with handling of the product (step 420).

In this embodiment, classifying the product into a handling class associated with handling of the product may include generating at least one risk score associated with handling of the product. The at least one risk score may indicate a probability that the product belongs to a particular risk category. The particular risk categories may be related to shipping, handling and/or storage of the product. Example risk categories include fragile, sharp, large, counterfeit, dangerous goods, flammable materials, lithium batteries, aerosols, toxic and infectious substances, corrosives and batteries, lithium batteries, explosives, knives, ammunition, live animals, etc.

The at least one risk score may be a number between zero (0.0) and one (1.0). A risk score of 0.0 may indicate a 0% probability that the product belongs to a particular risk category and a risk score of 1.0 may indicate a 100% probability that the product belongs to a particular risk category. A risk score of 0.30 may indicate a 30% probability that the product belongs to a particular risk category.

In this embodiment, the server may engage a machine-learning based module to generate the at least one risk score associated with handling of the product. The machine-learning based module may be part of the engine 300 and may include one or more classifiers trained to analyze the product information to predict a probability that the product belongs to one or more risk categories. Each classifier may be a binary classifier or a multiclass classifier. Each classifier may be associated with a particular risk category.

Example classifiers that may applicable to producing at least some implementations of embodiments described herein include "ImageNet Classification with Deep Convolutional Neural Networks", authored by Krizhevsky et al., Communications of the ACM (Volume 60, Issue 6, June 2017), pp. 84-90 and available on the Internet: <https://papers.nips.cc/paper/2012/file/c399862d3b9d6b76c8436e924a68c45b-Paper.pdf>, "Image Similarity Using Deep CNN and Curriculum Learning,", authored by Appalaraju et al., arXiv:1709.08761, 2017 and available on the Internet: <https://arxiv.org/pdf/1709.08761.pdf>, and "Cost-Effective Active Learning for Deep Image Classification," authored by Wang et al., IEEE Transactions on Circuits and Systems for Video Technology (Volume 27, Issue 12, December 2017), pp. 2591-2600 and available on the Internet <https://arxiv.org/pdf/1701.03551.pdf>, the contents of which are incorporated herein by reference in their entirety.

The one or more classifiers may be trained using training data. The training data may include a large number of example cases which map inputs to expected outputs. Machine-learning algorithms such as for example convolutional neural networks (CNNs), support-vector machine (SVM) and/or Adaboost may be used.

The one or more classifiers may be trained or re-trained based on data relating to one or more products that have been refused by a fulfillment center. Put another way, when a particular product has been refused by a fulfillment center, the product information may be included with the training data for the relevant classifiers to continually improve the accuracy thereof. A product may be refused by a fulfillment center when the fulfillment center determines that the product is unsafe or unfit for handling.

The one or more classifiers may be trained or re-trained by one or more merchants. For example, the machine-learning based module may prompt a user to label random data for a target category to label data with a probability of belonging to the target category in order to mitigate risk of generating a false positive (or a false negative), and to label products with a probability close to 0.5 for the target category to refine the classification.

As mentioned, the product information may include one or more product images. In this embodiment, the machine-learning based module may analyze the one or more product images to generate the at least one risk score. For example, the machine-learning based module may include a binary classifier trained to predict a probability that a product is "fragile" or "not fragile". Responsive to analyzing the one or more product images, the binary classifier may generate a risk score indicating a probability that the product is "fragile" or "not fragile". For example, a product that is more probable to be "fragile" may have a higher risk score than a product that is more probable to be "not fragile". Put another way, the more likely a product is to be fragile, the higher the risk score.

The machine-learning based module may analyze the one or more product images to identify one or more hazardous symbols. For example, a pre-trained machine learning module based on one or more convolutional neural networks (CNNs) may be used to identify hazardous symbols. As another example, image processing techniques such as optical character recognition (OCR) may be used and the result may be analyzed to identify one or more hazardous symbols. When it is determined that a product includes a hazardous symbol, the risk score may be generated to indicate that the product has a 100% probability of belonging to a risk category associated with the hazardous symbol. For example, the result of the image analysis may identify that a product includes a flammable materials symbol and as such the risk score for the risk category of "flammable materials" may be generated as 1.0 indicating that the product has a 100% probability of containing "flammable materials".

It will be appreciated that image processing techniques such as OCR may additionally or alternatively be used to obtain additional product information. For example, the result of OCR may be analyzed to identify a product as belonging to a product category such as "electronics" and thus is more likely to contain lithium ion batteries. As such, the risk score may be generated to indicate that the product is more likely to belong to the risk category "contains lithium ion batteries" than not.

It will be appreciated that other techniques may be employed that utilize, for example, word embeddings and/or generative statistical models.

As mentioned, the product information obtained from the merchant may include a product description. The product description may be analyzed by the machine-learning based module to generate the at least one risk score. For example, the product description of a knife may state that the knife has "an 8" blade" and as such this information may be used to generate a risk score for the risk category "knives" and/or the risk category "sharp". Of course, the product description and/or name of the product may specify that the product is indeed a knife and this may be used to generate the risk score for the risk category "knives" and/or the risk category "sharp".

Multiple risk scores for a product may be generated where each risk score is associated with a particular risk category. In one or more embodiments, the risk scores for all risk categories may be combined to generate a risk score for the product. For example, an average risk score may be calculated. As another example, the risk scores for all risk categories may be compared and the highest risk score may be determined and set as the risk score for the product.

The at least one risk score may be used to classify the product into a particular handling class. For example, the risk score for the product may be compared to a risk threshold to classify the product into a particular handling class. The particular handling class may be a first particular handling class for products determined to be high risk or unsafe, a second particular handling class for products determined to be low risk or safe, or a third particular handling class for products determined to be medium risk.

In this embodiment, the risk threshold may be a default risk threshold. For example, the risk threshold may be 0.3 to 0.7. A risk score below 0.3 may indicate that the product is low risk, a risk score between 0.3 to 0.7 may indicate that the product is medium risk and a risk score above 0.7 may indicate that the product is high risk. The risk threshold may additionally or alternatively be dependent on the risk category. For example, a first risk category may have a threshold between 0.1 to 0.9 and a second risk category may have a threshold between 0.2 and 0.8. As will be described in more detail, the risk threshold may additionally or alternatively be dependent on a risk profile of the merchant and/or be dependent on a risk profile of the fulfillment center.

In one or more embodiments, the merchant may be required to indicate one or more risk categories for the product. For example, when a merchant is adding a new product to their online store, the server may send a signal to the merchant device 102 corresponding to a request to identify one or more known risk categories of the product. The one or more known risk categories may be associated with one or more risks associated with handling of the product. The signal corresponding to the request to identify one or more known risk categories of the product may cause the merchant device 102 to display the request to identify one or more known risk categories of the product. For example, the merchant device 102 may display a graphical user interface (GUI) that includes a list of risk categories. The user may select or deselect one or more of the risk categories using an input interface associated with the merchant device 102. For example, the user may select one of the risk categories by performing a tap gesture on a display screen of the merchant device 102 at a location corresponding to the displayed risk category. Responsive to the user selecting one or more risk categories, the server may receive a signal identifying the one or more known risks. In this manner, the merchant identifies known risks associated with handling the product and the known risks may be used to generate the at least one risk score for the product. This information may be additionally used to generate a risk profile for the merchant as will be described in more detail below.

The method 400 includes storing an indication of the classification in association with the product information about the product (step 430).

Once the product has been classified into a handling class associated with handling of the product, an indication of the classification is stored in associated with the product information about the product. For example, an indication of the classification may identify that the product is high risk, low risk or medium risk. The server may store the indication of the classification in memory.

As mentioned, in at least some embodiments, the at least one risk score may be used to classify the product into a particular handling class. An indication of the at least one risk score may also be stored in association with the product information about the product. The server may store the at least one risk score in memory.

In embodiments where a single risk score is generated for the product, an indication of the risk score may be stored. In embodiments where multiple risk scores for the product are generated, an indication of the risk scores and the associated risk categories may be stored. In embodiments where the risk scores for all risk categories are combined to generate a risk score for the product, an indication of the risk score for the product may be stored. An indication of all risk scores used to generate the risk score for the product and the associated categories may additionally be stored. In embodiments where a maximum risk score is selected as the risk score for the product, an indication of the maximum risk score may be stored. An indication of all risk scores compared to determine the maximum risk score and the associated categories may additionally be stored.

Figure 5:
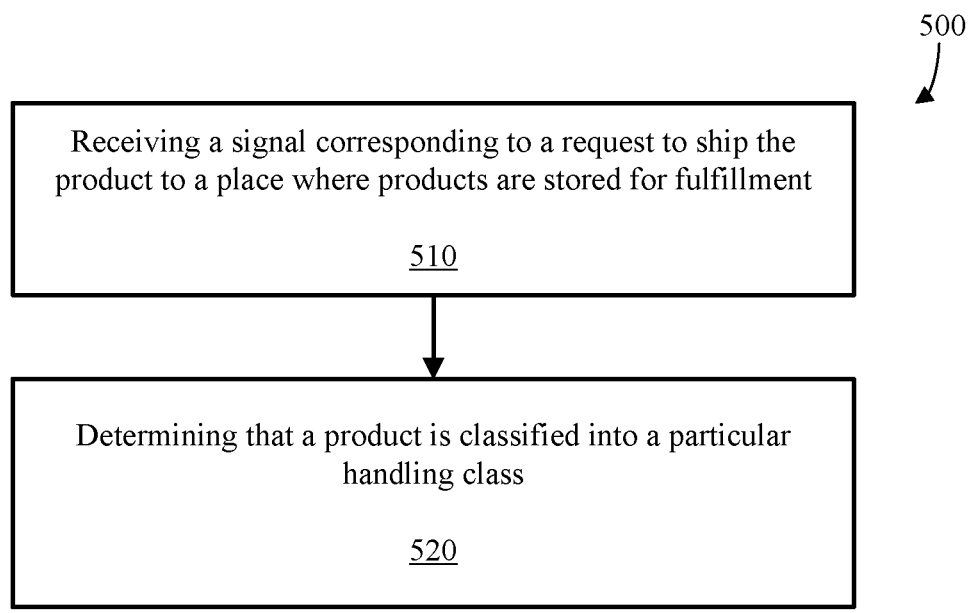
FIG. 5 is a flowchart illustrating an example method of determining that a product is classified into a particular handling class.

The indication of the classification is retrievable for use in automating handling of a product. Put another way, the indication of the classification may be retrieved and used to determine whether or not the product can be shipped and/or to determine how to handle the product. For example, when a request to ship the product to a place where products are stored for fulfillment is received, the indication of the classification may be used to determine whether or not the product can be shipped. An example method 500 for determining that a product is classified into a particular handling class is described below with reference to FIG. 5. The method 500 may be implemented by a computing device having suitable computer-executable instructions for causing the computing device to carry out the described operations. The instructions may be implemented by way of an application executing on a computing device. The method 500 may be implemented, in whole or in part, by a server that may be part of the e-commerce platform 100 and/or the engine 300. The server may off-load some operations of the method 500 to a user device such as the merchant device 102 (FIGS. 1 and 3).

The method 500 includes receiving a signal corresponding to a request to ship the product to a place where products are stored for fulfillment (step 510).

In this embodiment, the signal may be received from the merchant device 102. The signal may include information identifying the product and information identifying the place where products are stored for fulfillment. For example, the signal may include information identifying a particular fulfillment center where the product is to be stored for fulfillment.

Using the information identifying the product, the server may obtain the indication of the classification. For example, the server may retrieve the indication of the classification that was generated using method 400 described herein from memory.

The method 500 includes determining that a product is classified into a particular handling class (step 520). As mentioned, the particular handling class may be a first particular handling class, a second particular handling class or a third particular handling class.

Figure 6:
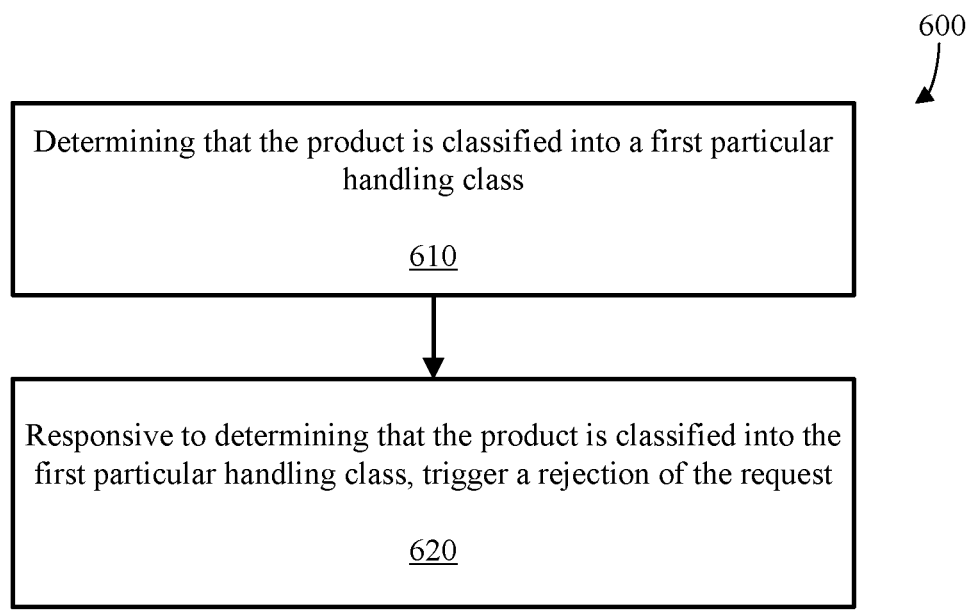
FIG. 6 is a flowchart illustrating an example method performed in response to determining that the product is classified into a first particular handling class.

In determining that the product is classified into a particular handling class, the server may determine that product is classified into the first particular handling class. An example method 600 performed in response to determining that the product is classified into the first particular handling class is described below with reference to FIG. 6. The method 600 may be implemented by a computing device having suitable computer-executable instructions for causing the computing device to carry out the described operations. The instructions may be implemented by way of an application executing on a computing device. The method 600 may be implemented, in whole or in part, by a server that may be part of the e-commerce platform 100 and/or the engine 300. The server may off-load some operations of the method 600 to a user device such as the merchant device 102 (FIGS. 1 and 3).

The method 600 includes determining that the product is classified into the first particular handling class (step 610).

As mentioned, the product may be classified into the first particular handling class based on the at least one risk score. In embodiments where the at least one risk score is a single risk score for the product, the single risk score is compared to the risk threshold and when the risk score is above the risk threshold, the product is classified into the first particular handling class.

In embodiments where the at least one risk score includes multiple risk scores and associated risk categories, if one of the risk scores is above the risk threshold, it is determined that the at least one risk score is above the risk threshold and the product is classified into the first particular handling class. Put another way, even if only one of the risk scores is above the risk threshold, it is determined that the at least one risk score is above the risk threshold and the product is classified into the first particular handling class.

Responsive to determining that the product is classified into the first particular handling class, the server triggers a rejection of the request to ship the product to the place where products are stored for fulfillment (step 620).

When it is determined that the product is classified into the first particular handling class, the server triggers a rejection of the request. The server may send a signal representing a notification to the merchant device 102 indicating that the product is too risky to be shipped and that the request has been rejected. The notification may additionally provide the merchant with one or more recommendations that may result in the product being accepted for shipment. For example, the fulfillment center selected by the merchant may not accept the product as it may not be equipped to store the product. The server may however suggest a different fulfillment center that may accept the product and this may be indicated in the notification. As another example, the product may include lithium ion batteries. The server may suggest that if the lithium ion batteries were removed from the product, the product may be accepted.

Figure 7:
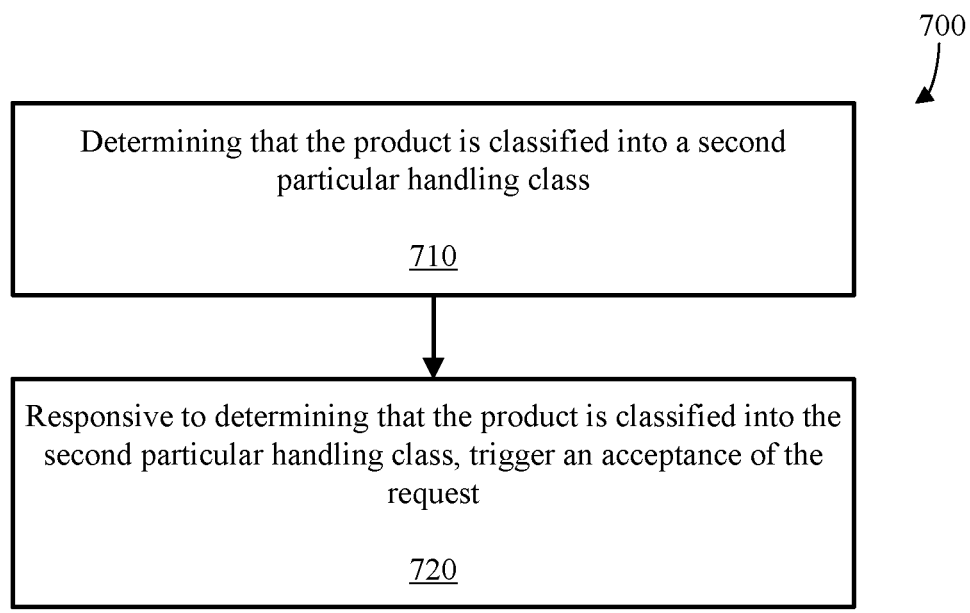
FIG. 7 is a flowchart illustrating an example method performed in response to determining that the product is classified into a second particular handling class.

In determining that the product is classified into a particular handling class, the server may determine that product is classified into the second particular handling class. An example method 700 performed in response to determining that the product is classified into the second particular handling class is described below with reference to FIG. 7. The method 700 may be implemented by a computing device having suitable computer-executable instructions for causing the computing device to carry out the described operations. The instructions may be implemented by way of an application executing on a computing device. The method 700 may be implemented, in whole or in part, by a server that may be part of the e-commerce platform 100 and/or the engine 300. The server may off-load some operations of the method 700 to a user device such as the merchant device 102 (FIGS. 1 and 3).

The method 700 includes determining that the product is classified into the second particular handling class (step 710).

As mentioned, the product may be classified into the second particular handling class based on the at least one risk score. In embodiments where the at least one risk score is a single risk score for the product, the single risk score is compared to the risk threshold and when the risk score is below the risk threshold, the product is classified into the second particular handling class.

In embodiments where the at least one risk score includes multiple risk scores and associated risk categories, all risk scores must be below the risk threshold to determine that the at least one risk score is below the risk threshold. Responsive to determining that all risk scores are below the risk threshold, the product is classified into the second particular handling class.

Responsive to determining that the product is classified into the second particular handling class, the server may trigger an acceptance of the request to ship the product to the place where products are stored for fulfillment (step 720).

When it is determined that the product is classified into the second particular handling class, the server triggers an acceptance of the request. The server may send a signal representing a notification to the merchant device 102 indicating that the request to ship the product to the place where products are stored for fulfillment has been accepted. The product may then be shipped.

Figure 8:
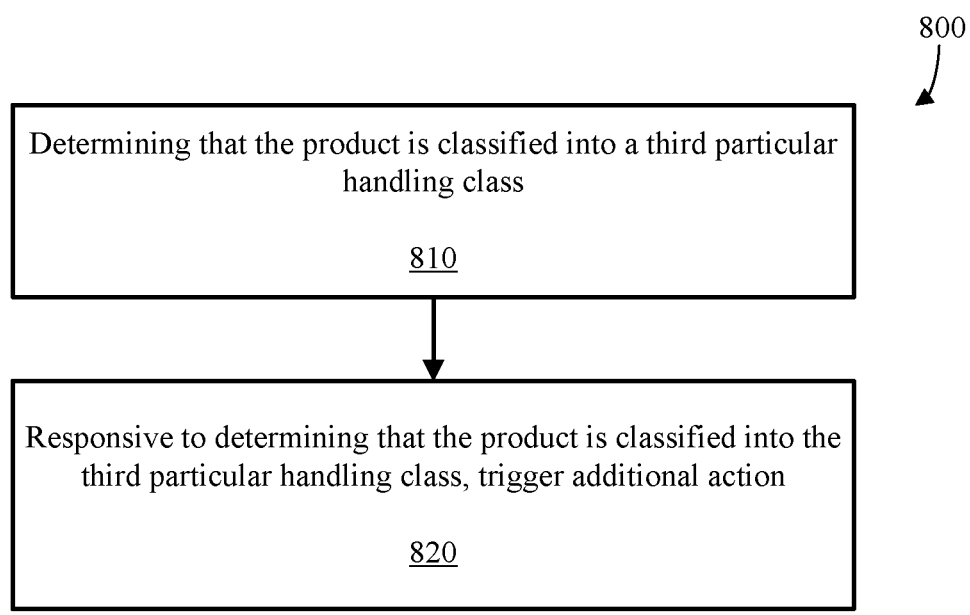
FIG. 8 is a flowchart illustrating an example method performed in response to determining that the product is classified into a third particular handling class.

In determining that the product is classified into a particular handling class, the server may determine that product is classified into the third particular handling class. An example method 800 performed in response to determining that the product is classified into the third particular handling class is described below with reference to FIG. 8. The method 800 may be implemented by a computing device having suitable computer-executable instructions for causing the computing device to carry out the described operations. The instructions may be implemented by way of an application executing on a computing device. The method 800 may be implemented, in whole or in part, by a server that may be part of an e-commerce platform 100 and/or the engine 300. The server may off-load some operations of the method 800 to a user device such as the merchant device 102 (FIGS. 1 and 3).

The method 800 includes determining that the product is classified into the third particular handling class (step 810).

As mentioned, the product may be classified into the third particular handling class based on the at least one risk score. In embodiments where the at least one risk score is a single risk score for the product, the single risk score is compared to the risk threshold and when the risk score is within the risk threshold, the product is classified into the third handling class.

In embodiments where the at least one risk score includes multiple risk scores and associated risk categories, all risk scores must not be above the risk threshold and at least one of the risk scores must be within the risk threshold to determine that the at least one risk score is within the risk threshold. Responsive to determining that all risk scores are not above the risk threshold and that at least one of the risk scores is within the risk threshold, the product is classified into the third handling class.

Responsive to determining that product is classified into the third particular handling class, the server may trigger an additional action (step 820).

The additional action may include requesting that the merchant accept an additional fee for shipping the product to the place where products are stored for fulfillment. In this example, the server may send a signal representing a notification to the merchant device 102 indicating that the request to ship the product to the place where products are stored for fulfillment will be accepted for an additional fee.

The additional fee may be based on the at least one risk category that is within the risk threshold. For example, a product may have a risk score under the risk threshold for the risk category of "flammable" but may have a risk score within the risk threshold for the risk category of "fragile." As such, the server may determine the additional fee for an item that is "fragile" and this may be included with the request. The request may be sent to the merchant device 102 and may include a selectable option that, when selected by the merchant, may indicate that the merchant has accepted the additional fee for shipping the product. Responsive to the merchant accepting the additional fee for shipping the product, the server may trigger an acceptance of the request. The product may then be shipped.

The additional action may include notifying the place where products are stored for fulfillment that inspection of the product is required. In this example, the server may send a signal representing a notification to a server associated with the fulfillment center, the notification may include information relating to the product and an indication that inspection of the product is required.

In one or more embodiments, in addition or in alternative to triggering an acceptance of the request to ship the product to a place where products are stored for fulfillment, the server may trigger generation of a shipping label. For example, when it is determined that the product is classified into a particular handling class, the server may generate a shipping label and may send a signal causing the merchant device to display a notification that includes a selectable option to print the shipping label. The shipping label may include or may display information relating to the classification. For example, the shipping label may include text identifying the particular handling class. As another example, the shipping label may include additional information. For example, in embodiments where the product is medium risk and thus classified into the third handling class, the shipping label may include information to ensure safe handling of the product. For example, the shipping label may include information such as "Warning: Fragile" and/or "Ground Transport Only."

In one or more embodiments, the shipping label may be encoded with the particular handling class and/or with the at least one risk score. For example, the shipping label may be encoded with information identifying that the product includes lithium ion batteries. Responsive to the shipping label being scanned by a scanning device, a signal may cause the scanning device to display information such as "Warning: Product Contains Lithium Ion Batteries."

In one or more embodiments, the shipping label may be encoded with the particular handling class and/or with the at least one risk score and this may be used to instruct one or more automated machines to handle the product safely. For example, responsive to the shipping label being scanned by a robotic handling device, a signal may be sent to the robotic handling device causing the robotic handling device to handle the product in a particular manner. For example, the signal may be processed by the robotic handling device to determine that the product must be sent down a particular conveyor belt. As another example, the signal may be processed by the robotic handling device to determine what type of shipping must be used. In this manner, the indication of classification may be used to automatically generate a shipping/handling label for the product such that the label includes a scannable code that may instruct a robotic handling device on how to ship and/or handle the product in a safe manner.

As mentioned, the risk threshold may be dependent on a risk profile of the merchant. In one or more embodiments, the risk profile of the merchant may be based on a shipping history of the merchant. For example, the server may determine that the merchant has previously shipped a number of products that were determined to be low risk by the fulfillment center upon first product inspection and as such the risk profile of the merchant may identify the merchant as "low risk". The risk threshold may be increased (compared to the default risk threshold) for the merchant and this may indicate that the merchant is more trustworthy than an average merchant.

As another example, the server may determine that the merchant has previously shipped a product that was determined to be high risk by the fulfillment center upon first product inspection and as such the risk profile of the merchant may identify the merchant as "high risk". The risk threshold may be decreased (compared to the default risk threshold) for the merchant and this may indicate that the merchant is less trustworthy than an average merchant.

As yet another example, the server may determine that the merchant has one or more risky products on their online store and as such the risk threshold may be decreased (compared to the default risk threshold) for the merchant.

The risk profile of the merchant may additionally or alternatively be based on a comparison of the at least one risk score generated by the machine-learning based module to the one or more known risk categories indicated by the merchant. For example, the machine-learning based module may generate a risk score indicating a high probability that the product belongs to the risk category "flammable". The merchant may not have indicated "flammable" as a risk category for the product. By comparing the at least one risk score generated by the machine-learning based module to the risk categories indicated by the merchant, the server may identify a discrepancy and may request confirmation from the merchant. For example, the server may send a signal to the merchant device 102 representing a request to confirm that the product is not flammable. The request may include a selectable option that, when selected, confirms that the product is not flammable and may include a selectable option that, when selected, confirms that the product is indeed flammable. Responsive to the merchant selecting the selectable option confirming that the product is indeed flammable, the risk threshold may be decreased (compared to the default risk threshold) for the merchant. In this manner, the merchant may be deemed riskier when the machine-learning based module identifies a risk not identified by the merchant.

The risk threshold may additionally or alternatively be dependent on the fulfillment center. For example, a particular fulfillment center may specify one or more risk categories that they do not accept. As such, any requests to ship a product to the particular fulfillment center for a product that has a probability of belonging to the one or more risk categories that are not accepted by the particular fulfillment center may be rejected. Put another way, the probability of the product belonging to the one or more risk categories that are not accepted by the particular fulfillment center must be equal to 0.0 in order for the request to be accepted.

As another example, a particular fulfillment center may be located in a country that does not accept items within one or more particular risk categories. As such, any requests to ship a product to the particular fulfillment center for a product that has a probability of belonging to the one or more risk categories that are not accepted by the particular fulfillment center may be rejected. Put another way, the probability of the product belonging to the one or more risk categories that are not accepted by the particular fulfillment center must be less than a tolerance threshold in order for the request to be accepted. The tolerance threshold may be for example 0.1.

In one or more embodiments, the server may store a risk threshold and/or a tolerance threshold associated with known fulfillment centers in memory and, responsive to receiving a request to ship a product to a particular fulfillment center, the server may obtain the risk threshold and/or the tolerance threshold associated with the particular fulfillment center from memory. The server may similarly store a risk threshold associated with a merchant in memory and, responsive to receiving a request to ship a product from the merchant, the server may obtain the risk threshold associated with the merchant. It will be appreciated that the risk thresholds may be updated by the server in response to one or more actions. For example, when the merchant is found to have shipped a product that should not have been allowed, the risk threshold for the merchant may be adjusted.

In embodiments where the risk threshold is dependent on the merchant and/or the fulfillment center, the server may be required to obtain the risk threshold. For example, during step 510 of method 500 described herein, the server may obtain the risk threshold from memory based on at least one of the merchants who submitted the request or a particular fulfillment center identified in the request.

It will be understood that some of the steps of the example methods described herein may be performed in a different order or simultaneously without materially impacting the operation thereof.

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g. Long Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and/or one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

What is claimed is:

1. A computer-implemented method comprising:
   collecting training data based on data relating to one or more products that have been refused by one or more fulfillment centers, the training data including product information about the one or more products;
   creating a first training set comprising the training data;
   training one or more classifiers using the first training set;
   determining that at least one other product has been refused by the one or more fulfillment centers based on a determination by the one or more fulfillment centers that the at least one other product is unsafe or unfit for handling;

creating a second training set comprising product information about the at least one other product that has been refused by the one or more fulfillment centers;

re-training the one or more classifiers using the second training set;

receiving, from a computing device associated with a merchant, product information about a product that includes at least one image of the product and a description of the product;

engaging a machine-learning module that includes the one or more classifiers trained to analyze the product information to predict a probability that the product belongs to one or more risk categories to:
  generate at least one risk score associated with handling of the product, the at least one risk score indicating the probability that the product belongs to a particular one of the risk categories;
  combine all generated risk scores for the product to determine an overall risk score for the product;
  classify the product into a handling class associated with handling of the product based on the overall risk score for the product; and storing an indication of the classification in association with the product information about the product in a database for retrieval to automate handling of the product.

2. The computer-implemented method of claim 1, further comprising:
  determining that the product is classified into a particular handling class; and
  responsive to determining that the product is classified into the particular handling class, triggering generation of a shipping label.

3. The computer-implemented method of claim 1, further comprising:
  receiving a signal corresponding to a request to ship the product to a place where products are stored for fulfillment.

4. The computer-implemented method of claim 3, further comprising:
  determining that the product is classified into a first particular handling class; and
  responsive to determining that the product is classified into the first particular handling class, triggering a rejection of the request to ship the product to the place where products are stored for fulfillment.

5. The computer-implemented method of claim 3, further comprising:
  determining that the product is classified into a second particular handling class; and
  responsive to determining that the product is classified into the second particular handling class, triggering an acceptance of the request to ship the product to the place where products are stored for fulfillment.

6. The computer-implemented method of claim 3, further comprising:
  determining that the product is classified into a third particular handling class; and
  responsive to determining that the product is classified into the third particular handling class, triggering a request to accept an additional fee for shipping the product to the place where products are stored for fulfillment.

7. The computer-implemented method of claim 1, wherein classifying the product into the handling class associated with handling the product includes:
  comparing the overall risk score to a threshold to classify the product into the handling class associated with handling the product.

8. The computer-implemented method of claim 7, further comprising:
  obtaining information relating to one or more other products previously shipped by the merchant; and
  adjusting the threshold based on the information relating to the one or more other products previously shipped by the merchant.

9. The computer-implemented method of claim 1, wherein receiving product information about the product comprises:
  sending, to the computing device associated with the merchant, a signal corresponding to a request to identify one or more known risks associated with handling of the product; and
  receiving, from the computing device associated with the merchant, a signal identifying one or more known risks associated with handling of the product.

10. The computer-implemented method of claim 9, further comprising:
  determining, based at least on the at least one risk score, that the machine-learning based module has identified a risk not identified by the merchant;
  sending, to the computing device associated with the merchant, a signal corresponding to a request to confirm that the product has the risk not identified by the merchant; and
  receiving, from the computing device associated with the merchant, a signal confirming that the product has the risk not identified by the merchant.

11. The computer-implemented method of claim 1, wherein combining all generated risk scores for the product to determine the overall risk score for the product comprises at least one of:
  calculating an average risk score using all generate risk scores to determine the overall risk score; or
  comparing all generated risk scores to determine a highest generated risk score and determining the overall risk score as the highest generated risk score.

12. The computer-implemented method of claim 1, wherein the one or more classifiers are trained to analyze the product information to predict the probability that the product belongs to one or more risk categories at least by processing the at least one image of the product to identify one or more hazardous symbols located on the product.

13. The computer-implemented method of claim 12, wherein the at least one risk score is assigned a maximum risk score for a particular risk category in response to identifying a hazardous symbol associated with the particular risk category during the processing of the at least one image of the product.

14. A system comprising:
  one or more processors;
  a processor-readable storage medium containing processor-executable instructions that, when executed by the one or more processors, are to cause the one or more processors to:
    collect training data based on data relating to one or more products that have been refused by one or more fulfillment centers, the training data including product information about the one or more products;

create a first training set comprising the training data;
train one or more classifiers using the first training set;
determine that at least one other product has been refused by the one or more fulfillment centers based on a determination by the one or more fulfillment centers that the at least one other product is unsafe or unfit for handling;
create a second training set comprising product information about the at least one other product that has been refused by the one or more fulfillment centers;
re-train the one or more classifiers using the second training set;
receive, from a computing device associated with a merchant, product information about a product that includes at least one image of the product and a description of the product;
engage a machine-learning module that includes the one or more classifiers trained to analyze the product information to predict a probability that the product belongs to one or more risk categories to:
  generate at least one risk score associated with handling of the product, the at least one risk score indicating the probability that the product belongs to a particular one of the risk categories;
  combine all generated risk scores for the product to determine an overall risk score for the product;
  classify the product into a handling class associated with handling of the product based on the overall risk score for the product; and
store an indication of classification in association with the product information about the product in a database for retrieval to automate handling of the product.

15. The system of claim 14, wherein the processor-executable instructions, when executed by the one or more processors, are to further cause the one or more processors to
determine that the product is classified into a particular handling class; and
responsive to determining that the product is classified into the particular handling class, trigger generation of a shipping label.

16. The system of claim 14, wherein the processor-executable instructions, when executed by the one or more processors, are to further cause the one or more processors to:
receive a signal corresponding to a request to ship the product to a place where products are stored for fulfillment.

17. The system of claim 16, wherein the processor-executable instructions, when executed by the one or more processors, are to further cause the one or more processors to:
determine that the product is classified into a first particular handling class; and
responsive to determining that the product is classified into the first particular handling class, trigger a rejection of the request to ship the product to the place where products are stored for fulfillment.

18. The system of claim 16, wherein the processor-executable instructions, when executed by the one or more processors, are to further cause the one or more processors to:
determine that the product is classified into a second particular handling class; and
responsive to determining that the product is classified into the second particular handling class, trigger an acceptance of the request to ship the product to the place where products are stored for fulfillment.

19. The system of claim 16, wherein the processor-executable instructions, when executed by the one or more processors, are to further cause the one or more processors to:
determine that the product is classified into a third particular handling class; and
responsive to determining that the product is classified into the third particular handling class, trigger a request to accept an additional fee for shipping the product to the place where products are stored for fulfillment.

20. The system of claim 14, wherein, when classifying the product into the handling class associated with handling the product, the processor-executable instructions, when executed by the one or more processors, are to further cause the one or more processors to:
compare the overall risk score to a threshold to classify the product into the handling class associated with handling the product.

21. The system of claim 14, wherein when receiving product information about the product, the processor-executable instructions, when executed by the one or more processors, are to further cause the processor to:
send, to the computing device associated with the merchant, a signal corresponding to a request to identify one or more known risks associated with handling of the product; and
receive, from the computing device associated with the merchant, a signal identifying one or more known risks associated with handling of the product.

22. The system of claim 21, wherein the processor-executable instructions, when executed by the one or more processors, are to further cause the processor to:
determine, based at least on the at least one risk score, that the machine-learning based module has identified a risk not identified by the merchant;
send, to the computing device associated with the merchant, a signal corresponding to a request to confirm that the product has the risk not identified by the merchant; and
receive, from the computing device associated with the merchant, a signal confirming that the product has the risk not identified by the merchant.

23. The system of claim 14, wherein the processor-executable instructions, when executed by the one or more processors, are to further cause the one or more processors to:
collect training data based on data relating to one or more products that have been refused by one or more fulfillment centers, the training data including product information about the one or more products;
create a first training set comprising the training data; and
train the one or more classifiers using the first training set.

24. The system of claim 14, wherein the one or more classifiers are trained to analyze the product information to predict the probability that the product belongs to one or more risk categories at least by processing the at least one image of the product to identify one or more hazardous symbols located on the product.

25. A non-transitory computer-readable storage medium storing processor-executable instructions that, when executed by one or more processors, are to cause the one or more processors to:
collect training data based on data relating to one or more products that have been refused by one or more fulfillment centers, the training data including product information about the one or more products;
create a first training set comprising the training data;
train one or more classifiers using the first training set;
determine that at least one other product has been refused by the one or more fulfillment centers based on a determination by the one or more fulfillment centers that the at least one other product is unsafe or unfit for handling;
create a second training set comprising product information about the at least one other product that has been refused by the one or more fulfillment centers;
re-train the one or more classifiers using the second training set;
receive, from a computing device associated with a merchant, product information about a product that includes at least one image of the product and a description of the product;

engage a machine-learning module that includes the one or more classifiers trained to analyze the product information to predict a probability that the product belongs to one or more risk categories to:
  generate at least one risk score associated with handling of the product, the at least one risk score indicating the probability that the product belongs to a particular one of the risk categories;
  combine all generated risk scores for the product to determine an overall risk score for the product;
  classify the product into a handling class associated with handling of the product based on the overall risk score for the product; and
store an indication of classification in association with the product information about the product in a database for retrieval to automate handling of the product.

* * * * *